3,505,256
COATING COMPOSITION WITH IMPROVED PROPERTIES CONTAINING A LINEAR AMORPHOUS FILM-FORMING POLYMER AND AN ADJUVANT

Walter M. Duffy, Wallingford, Pa., and Donald A. Pascale, Cherry Hill, N.J., assignors to E. I. du Pont de Nemours and Company, Wilmington, Del., a corporation of Delaware
No Drawing. Filed Dec. 23, 1965, Ser. No. 516,124
Int. Cl. C08f *29/50;* C09d *3/80*
U.S. Cl. 260—22                                           6 Claims

ABSTRACT OF THE DISCLOSURE

A process for improving the application properties of a solution coating composition by adding to the composition a particular kind of graft copolymer, and coating compositions prepared by this process.

---

This invention relates to liquid coating compositions and more particularly to coating compositions comprising a polymer solution which can be sprayed at unusually high solids level without adverse effect.

Coatings obtained by the application of liquid coating compositions (e.g., paints and lacquers) employing a polymer such as polymethyl methacrylate as the principal film-forming constituent have outstanding durability and gloss retention, but unfortunately solutions of such polymers must be sprayed at a relatively low polymer solids concentration (e.g., less than about 12%) in order to provide acceptable film properties, particularly with respect to gloss, orange peel, webbing and the like. Thus several spray coatings must be applied to achieve acceptable film thickness. A coating composition capable of being sprayed at higher polymer solids concentration would permit the coating of articles with proportionately fewer passes and a significant saving in time and expense.

According to this invention there is provided a novel coating composition which consists essentially of a solution of a film-forming polymer, such as polymethyl methacrylate, and which nevertheless can be sprayed at a higher solids content than has heretofore been possible for such solutions. The coating composition of this invention consists essentially of (1) A solution of a linear amorphous film-forming polymer in a volatile organic solvent, said polymer being prepared by solution, aqueous emulsion or bulk polymerization techniques, and (2) An adjuvant which is a block or graft copolymer which (a) contains at least two polymeric segments which differ in solubility parameter [1] from each other by ±2,
(b) contains at least one polymeric segment which differs in solubility parameter from said film-forming polymer by ±2,
(c) contains at least two polymeric segments each of at least two of them having a molecular weight of at least 2000, and
(d) contains at least one segment which is soluble or swollen by said organic solvent.

This composition, which can also contain conventional pigments, plasticizers and other innocuous additives, can be applied using conventional automotive spray apparatus and conditions at a polymer solids concentration up to 20% by weight and even higher to produce a coated substrate having an attractive and durable smooth glossy finish. The composition of this invention permits the use of higher solids spray concentrations than previously used and also provides substantial improvements in the properties of the dried coating produced thereby, including thermal reflow, water spot resistance, print resistance and craze resistance. Previously this high level of properties was obtainable only by incorporating cellulose acetate butyrate in the composition. The reasons for the improvement in these properties are not entirely understood.

The film-forming polymer utilized in the composition of this invention can be any linear amorphous polymer prepared separately from the adjuvant utilized and capable of being cast or formed from solution into supported or unsupported film. A "linear" polymer contains a single polymeric segment and is not a block or graft copolymer having the solubility parameters set forth above and is not crosslinked, though it may have pendant groups attached to its backbone. The film-forming polymers can be prepared by polymerization in solution, bulk, aqueous emulsion or by any other convenient method. It is important that the film-forming polymer be amorphous, that is, that it exhibit a diffuse X-ray diffraction pattern. Any polymer which is useful as a film-former in coating compositions, such as lacquers or paints, can be used. Preferred polymers are acrylic homopolymers and copolymers generally such as polymethyl methacrylate and copolymers of methyl methacrylate with other acrylic monomers such as acrylic acid, methacrylic acid and esters of these acids such as methyl acrylate, ethyl acrylate, butyl acrylate, ethyl methacrylate and butyl methacrylate. Acrylic monomers containing less than about ten carbon atoms are preferred but larger monomers can be utilized.

Similarly, polymers and copolymers of styrene, alpha-methyl styrene, vinyl toluene, vinyl acetate, vinyl and vinylidene halide copolymer, glacidyl methacrylate, tetrahydroxy furfural methacrylate, acrylonitrile and blends and mixtures of these may also be utilized. Condensation polymers such as polyesters and polyamides can also serve as the film-forming polymer of the coating composition of this invention.

The adjuvants of this invention are block or graft copolymers having molecular weights of at least about 4000. A "graft copolymer" is a copolymer which contains a polymeric backbone and at least one polymeric side chain. The graft copolymers of this invention are prepared by reacting a grafting monomer or polymer or mixtures thereof with a polymer capable of undergoing a grafting reaction to become the backbone of the resulting graft copolymer. Any graft copolymer is useful in this invention so long as it contains at least two polymeric segments with each of at least two of them having a molecular weight of at least about 2000, and possessing the solubility parameters set forth above relative to each other, the film-forming polymer and the organic solvent medium. In a graft copolymer, the backbone is ordinarily considered as one polymeric segment and each polymeric side chain is another segment. A block copolymer can be prepared by connecting at least two prepolymer units end-to-end. In a block copolymer each prepolymer unit in the block copolymer is a polymeric segment. Accordingly a graft copolymer in which the backbone is a block copolymer has a plurality of polymeric segments in the backbone, corresponding to the prepolymer units, as well as the side chain polymeric segments attached to the backbone. Coating compositions of this invention usually contain about 0.1–10% adjuvant based on the weight of amorphous film-forming polymer present and preferably 1–6% on this basis because of the superior properties achieved.

The backbone polymer used to form graft copolymers useful in this invention can be any polymer, which is

---

[1] Solubility parameter is defined in Hildebrand & Scott, "The Solubility of Nonelectrolytes," Reinhold Pub. Co., N.Y. (3rd edition, 1949); P. A. Small, J. Appl. Chem. 3, 71 (1953).

capable of undergoing grafting with a suitable grafting monomer or polymer but saturated backbone polymers are preferred. Preferably the backbone polymer is a polymer or copolymer of an aliphatic ester of an acrylic monomer such as acrylic or methacrylic acid with an alcohol having 1–26 carbon atoms such as, for example, methyl methacrylate, ethyl methacrylate, methyl acrylate, ethyl acrylate, 2-ethylhexyl acrylate, butyl methacrylate, lauryl methacrylate, stearyl methacrylate, chlorinated methacrylates and hydroxyl alkyl methacrylates such as hydroxy ethyl methacrylates. Similarly polymers and copolymers of acrylonitrile, caprolactone, styrene, butadiene and even alkyd resin may be utilized as the backbone polymers in the formation of graft copolymers useful in this invention.

As indicated above it is not necessary that the backbone polymer be a homopolymer. Copolymers of the above monomers and block copolymers are also useful as backbones so long as they may be grafted with a suitable grafting compound. Other backbone polymers which can be utilized include polypropylene, polyethylene, polybutylene and polyisobutylene. The backbone of the graft copolymer can also be any of the polymers or copolymers described above for use as the linear amorphous film-forming compositions.

Any of the above monomers suitable for grafting can be used as grafting monomers in forming graft copolymers of this invention and any of the above-mentioned polymers which can be grafted on a backbone polymer as above described is suitable for use as a grafting polymer in forming said graft copolymers. Similarly any of the above monomers and polymers which are suitable for forming block copolymers and combinations of block and graft copolymers can be utilized to form adjuvants useful in this invention.

The graft copolymers useful in this invention can be prepared by any convenient method, and those skilled in the art are well aware of methods for preparing graft and block copolymers having the above-described characteristics. Any of the conventional grafting procedures can be utilized, including those involving (1) hydrogen abstraction (e.g., with a peroxide), (2) reacting an active pendant group (e.g., carboxylic or unsaturated group) attached to a polymer chain with a polymer or polymerizable group and (3) photochemical grafting (e.g., using benzophenone as activator).

It is important that a segment of the graft copolymer or block copolymer be soluble in the volatile organic solvent in the coating composition or be swollen when in contact with such solvent. Swelling is an enlargement of a polymer due to absorption of at least 5% by weight solvent. A cross-linked polymer is normally swollen by a solvent which would be capable of dissolving the polymer to the extent of at least 5% by weight if the polymer were linear rather than cross-linked. A segment of a graft or block copolymer is soluble in or swollen by an organic solvent if the segment in the form of a separate and distinct polymer is soluble in or swollen by said solvent.

Any volatile organic liquid can be used as the solvent medium in practicing this invention provided it meets the solubility requirements set forth above relative to the linear amorphous polymer and the adjuvant. Esters and ketones are preferred solvents for acrylic type film-forming polymers and hydrocarbon solvents are used for polymers prepared from monomers such as butadiene, etc. Useful ketones and esters include all of those conventionally used in lacquers and paints, for example, acetone, methyl ethyl ketone, methyl isopropyl ketone, methyl isobutyl ketone, ethyl isopropyl ketone, ethyl isobutyl ketone, Cellosolve acetate, ethylene glycol, diacetate, ethyl acetate, methyl acetate and the like. Useful hydrocarbon solvents include pentane, hexane, VM and P naphtha, petroleum ethers and mixtures of these. Mixtures of these solvents can also be used.

Preferred adjuvants for use in this invention include those in the following table with particularly preferred proportions being indicated. The notations used can be understood from the following illustration. The expression "(2EHA←AN)(75←25)" refers to a graft copolymer of the monomers indicated: namely, 2-ethylhexyl acrylate and acrylonitrile in the proportions of 75 parts of the first mentioned monomer unit (2-ethylhexyl acrylate) to 25 parts of the second mentioned monomer unit (acrylonitrile). The expression "(2EHA–CL)(40–60)" refers to a 40/60 block copolymer of 2-ethylhexyl acrylate and caprolactone.

TABLE I (A) Graft copolymers:
    (1) (2EHA←MMA)(50←50)
    (2) (2EHA←MMA/MAA)(50←47.5/2.5)
    (3) (2EHA←AN)(75←25)
    (4) (EG←2EHA)(50←50)
    (5) (2EHA/HEMA←CL)(25←75)
    (6) (S/BD←FMA)(50←50)
    (7) (Alkyd←EA/MMA)(55←20/25)
    (8) (2EHA←BA)(50←50)
    (9) (2EHA←IBMA)(50←50)

(B) Block copolymers:
    (1) (2EHA–CL)(40–60)
    (2) (S–2EHA)(50–50)
    (3) (EG–2EHA)(50–50)
    (4) (EG–MMA)(50–50)

2EHA—2-ethylhexyl acrylate
MMA—methyl methacrylate
AN—acrylonitrile
EG—polyethylene glycol
HEMA—hydroxyethyl methacrylate
CL—caprolactone
S—styrene
S/BD—styrene/butadiene
FMA—fluorinated methacrylate
Alkyd—alkyd with pendant methacrylic acid groups prepared from phthalic acid, coconut oil, ethylene glycol and methacrylic acid
EA—ethyl acrylate
BA—butyl acrylate
IBMA—isobutyl methacrylate Graft copolymers usually contain about 5–95% backbone polymer and about 95–5% of graft segments based on total weight of the graft copolymer. The same ratios are applicable for the segments of block copolymers. Preferably the ratio will be in the range of 1:3–3:1 for both types of copolymers.

The coatings of this invention are prepared using conventional techniques and the ingredients may be mixed without regard to any particular order. These compositions can contain any of the conventional additives such as pigments, plasticizers and other materials which do not adversely affect the performance of the film-former and adjuvant. Any plasticizers present must be compatible with the film-forming polymer and because of plasticizer solvency effects must be considered in conjunction with the organic solvent medium present in evaluating the solvency of the polymer and the solubility parameters set forth above. Typical plasticizers which can be utilized include benzyl butyl phthalate, dibutyl phthalate and tributyl citrate. When present these are normally utilized in amounts of up to 40% based upon the weight of film-forming polymers present.

The following examples illustrate the invention. All parts and percentages are by weight unless otherwise indicated.

Example 1

A composition exemplary of this invention is prepared by first preparing a methyl methacrylate homopolymer (pMMA) (molecular weight=90,000) sutable for coating compositions by using a conventional solution polymerization procedure and dissolving it in a suitable solvent medium, a 70:30 toluene/acetone mixture, to produce a 40% solution. Benzyl butyl phthalate in the amount of about 33% based on the weight of polymethyl methacrylate is dissolved in a 70/30 toluene/acetone mixture to produce a 40% solids concentration and this solution is mixed with the 40% polymethyl methacrylate solution. To the resulting solution is then added an adjuvant which is a 50:50 graft copolymer of 2-ethylhexyl acrylate and methyl methacrylate (2EHA←MMA; 50←50) in the form of a 40% solution in n-hexane in sufficient amount to provide 2% adjuvant based on the weight of polymethyl methacrylate present. Thinner is then added to provide a 20% solids concentration. The thinner consists of 16% ethylene glycol diacetate, 15% Cellosolve acetate, 34% methyl isobutyl ketone and 35% xylene, all by weight.

Table I compares coatings produced by spraying the above lacquer with coatings prepared by spraying the same lacquer, lacking the adjuvant, at various solids concentrations. In each case the film was 2.5 mils thick and was flashed 15 minutes at 75° F. followed by 30 minutes at 260° F. The substrates were steel panels primed with conventional commercial primer.

| Spray Solids, percent | Adjuvant/pMMA | 20° Gloss | Appearance |
|---|---|---|---|
| 20 | 2% | 89 | Smooth. |
| 20 | None | 25 | Rough. |
| 18 | do | 43 | Orange peel. |
| 16 | do | 52 | Do. |
| 14 | do | 73 | Fairly smooth. |

As shown by the above table the polymethyl methacrylate lacquer without the adjuvant, even when sprayed at 14% solids concentration, did not produce as smooth an appearance as the lacquer containing the adjuvant which was sprayed at 20% solids concentration.

Example 2

A lacquer prepared as in Example 1 but containing 9% of the adjuvant based on weight of pMMA was sprayed at 20% solids on a metal substrate primed with conventional primer. After the coating was baked as in Example 1, it exhibited substantially improved thermal reflow, water spot resistance and print craze balanced compared with the same lacquer without the adjuvant present. This high level of film properties is normally obtained in a polymethyl methacrylate lacquer only by adding cellulose acetate butyrate to the lacquer.

Example 3

The procedure of Example 1 was repeated using the below listed graft copolymers and block copolymers as adjuvants:

(2EHA←MMA/MAA)(50←47.5/2.5)
(2EHA←AN)(75←25)
(EG←2EHA)(50←50)
(2EHA/HEMA←CL)(25←75)
(S/BD←FMA)(50←50)
(Alkyd←EA/MAA)(55←20/25)
(2EHA–CL)(40–60)
(S—2EHA)(50–50)
(EG–2EHA)(50–50)
(EG–MMA)(50–50)

Each of the coating compositions thus prepared was sprayed at 20% solids concentration in a 50/50 acetone/Cellosolve acetate mixture with the same excellent results as obtained in Example 1. The coating, after flashing for 15 minutes at 75° F. followed by 30 minutes at 260° F. had a film thickness of 2.7 mils and exhibited the superior properties of the coating produced in Example 2.

We claim:
1. In the process for preparing a coating composition comprising forming a solution of an acrylic film-forming polymer prepared by bulk, solution or emulsion polymerization, in a volatile organic solvent for said polymer, the improvement in combination therewith consisting essentially of admixing with said polymer solution about 0.1–10% of an adjuvant which is one of the following graft copolymers:

2-ethylhexyl acrylate←methyl methacrylate,
2-ethylhexyl acrylate←acrylonitrile,
polyethylene glycol←2-ethylhexyl acrylate,
2-ethylhexyl acrylate/hydroxyethyl methacrylate←caprolactone,
alkyd←ethyl acrylate/methyl methacrylate,
2-ethylhexyl acrylate←butyl acrylate,
2-ethylhexyl acrylate←isobutyl methacrylate.

2. The process of claim 1 in which the acrylic polymer contains methyl methacrylate units.

3. The process of claim 2 in which the acrylic polymer is poly(methyl methacrylate).

4. The coating composition prepared by the process of claim 1.

5. The coating composition prepared by the process of claim 2.

6. The coating composition prepared by the process of claim 3.

References Cited

UNITED STATES PATENTS

| | | | |
|---|---|---|---|
| 2,849,409 | 8/1958 | Evans | 260—17 |
| 3,041,309 | 6/1962 | Baer | 260—885 |
| 3,170,964 | 2/1965 | Grabowski | 260—876 |
| 3,268,622 | 8/1966 | Stanton et al. | 260—873 |
| 3,316,327 | 4/1967 | Baer et al. | 260—876 |
| 3,336,417 | 8/1967 | Sakuma et al. | 260—873 |
| 3,345,434 | 10/1967 | Griffith | 260—873 |
| 3,095,388 | 6/1963 | Osmond et al. | 260—4 |
| 3,166,524 | 1/1965 | Schmidle et al. | 260—23 |
| 3,322,858 | 5/1967 | Coaker et al. | 260—876 |
| 3,354,238 | 11/1967 | Schmitt et al. | 260—876 |
| 3,355,513 | 11/1967 | Sadron et al. | 260—885 |
| 3,405,087 | 10/1968 | Fryd | 260—873 |
| 3,393,162 | 7/1968 | Cox et al. | 260—33.6 |

HOSEA E. TAYLOR, Jr., Primary Examiner

R. W. GRIFFIN, Assistant Examiner

U.S. Cl. X.R.

117—132, 161; 260—23, 23.7, 31.2, 31.6, 31.8, 32.8, 33.6, 40, 41, 41.5, 873, 876, 884, 885